US006745248B1

(12) United States Patent
Gardos et al.

(10) Patent No.: US 6,745,248 B1
(45) Date of Patent: Jun. 1, 2004

(54) METHOD AND APPARATUS FOR ANALYZING DOMAIN NAME REGISTRATIONS

(75) Inventors: Robert D. Gardos, New York, NY (US); Adam D. Burstein, Brooklyn, NY (US); Chia Hsian-Yeh, Flushing, NY (US); Jonathan Rothman, New York, NY (US); Mark Calandra, Hoboken, NJ (US)

(73) Assignee: Register.com, Inc., New York, NY (US)

( * ) Notice: Subject to any disclaimer, the term of this patent is extended or adjusted under 35 U.S.C. 154(b) by 821 days.

(21) Appl. No.: 09/631,171

(22) Filed: Aug. 2, 2000

(51) Int. Cl.⁷ ................................................. G06F 15/16
(52) U.S. Cl. ....................... 709/245; 709/217; 709/219; 709/226; 709/228; 707/10; 707/201
(58) Field of Search ................................. 709/212–219, 709/225–226, 228–229, 245–248; 707/1–4, 10, 201, 203

(56) References Cited

U.S. PATENT DOCUMENTS

| | | | | |
|---|---|---|---|---|
| 5,884,038 A | * | 3/1999 | Kapoor | 709/226 |
| 6,205,489 B1 | * | 3/2001 | Kapoor | 709/245 |
| 6,298,341 B1 | * | 10/2001 | Mann et al. | 709/228 |
| 6,411,966 B1 | * | 6/2002 | Kwan et al. | 707/201 |
| 6,519,589 B2 | * | 2/2003 | Mann et al. | 707/3 |
| 6,681,228 B2 | * | 1/2004 | Balogh | 707/10 |

* cited by examiner

*Primary Examiner*—Bharat Barot
(74) *Attorney, Agent, or Firm*—Hogan & Hartson L.L.P.

(57) ABSTRACT

Downloading an authoritative zone file and performing searches within the zone file can identify all of the domain names registered to an entity. A method of identifying all of the domain names registered to an entity may including downloading a root zone file from a registry or from a root server and storing the root zone file as a text file with alphanumeric character strings associating each domain name with a registrar and at least one domain name server. A search characteristic is established corresponding to a character string comprising a significant part of one of the entity's domain names. A string search is performed in the download root zone file for the search characteristic to identify one or more domain names matching the search characteristic, as well as a registrar corresponding to the matching domain name and at least one domain name server associated with the matching domain name in the downloaded root zone file. Each matching domain name is stored in a data file, so that the data file associates each extracted domain name with the corresponding registrar and the at least one domain name server. The method continues by repeating, at least once, the successive processes of establishing a second search characteristic, extracting from the registry at least one additional domain name on the basis of the second search characteristic and storing each additional matching domain name in the data file.

7 Claims, No Drawings

METHOD AND APPARATUS FOR ANALYZING DOMAIN NAME REGISTRATIONS

BACKGROUND OF THE INVENTION

1. Field of the Invention

The present invention relates generally to the Internet and more specifically to a method and apparatus for identifying a set of domain name registrations meeting a characteristic or characteristics and the name servers related to the identified domain name registrations.

2. Description of the Related Art

Each computer on the Internet is identified by a unique Internet protocol ("IP") address. This address is a 32-bit number organized as four 8-bit values separated by periods such as 123.45.67.89. Such a numerical system, while useful as a routing address system for computer-to-computer communication, is not human user-friendly. Consequently, domain names are used to allow users to more easily identify and connect to a target computer on the network. These user-friendly domain names (or "host names"), such as "register.com", are easy for users to remember and, since they map to a unique IP number, accurately identify the computer's IP address. In such a domain name identification scheme, the domain name forms a part of the uniform resource locator (URL) that specifies the location of resources on the World Wide Web. The URL identifies the mechanism used to access the resource (e.g., http, ftp, etc.), the specific computer that houses the resource, and the specific name of the resource (such as a filename).

As with the underlying Internet address, domain names typically have a hierarchical organization, with the trailing portion of the domain name, such as .com, .net, org, .us, .uk or .jp, representing the top-level domain. Top-level domains include global top-level domains (gTLD) and country specific or country code top-level domains (ccTLD). The global top-level domains include .com, org, .net, .edu, .gov and .mil. Of these, .edu, .gov and .mil gTLD's are restricted to use by entities meeting specific qualifications. Country code top-level domains are country specific in that they identify registrations within a given country. The specific country governs registration for the country code top-level domains. Some countries are "open" in that they allow any entity to register a domain name within its ccTLD. Other countries are "closed" and only allow entities that meet restrictions such as residency to register domain names in that ccTLD. Most domain users presently use one or more of the .com, . net or .org gTLDs.

The domain name entered by a user is sent over the Internet to a global network of servers called the "domain name system" (DNS), which receives the domain name as a request and translates the domain name into the target computer's numerical IP address. The numerical IP address is returned to the user's computer to enable it to connect to the target computer. Typically, after the user enters the domain name, the rest of the process is invisible to the user until the user connects to the target computer. The domain name system consists of a collection of root servers or DNS Servers that provide a directory linking domain names with corresponding IP addresses. There are presently thirteen root servers worldwide that contain authoritative databases or "root zone files" listing all top-level domains. The collection of root servers is centrally managed for all global top-level domains to ensure that each computer on the network can be uniquely identified by unique domain names and numerical addresses.

A "registry" is an international organization or entity that is responsible for assigning domain names and Internet protocol addresses. Each country maintains its own registry, generally through a company or organization. The registry has the responsibility to record and update domain names and Internet protocol addresses, as well as the information associated with them, on the root servers. A registry is under contract from its respective government to control domain name registration. The registry may authorize other entities, known here as registrars, to conduct domain name registration and other aspects of the management of domain names and IP addresses. A "registrar" is an organization or company that is authorized to provide registration services for all users of certain top-level domains, such as the .net, .org and .com global top-level domains. Registrars are presently authorized either by ICANN, the Internet Corporation for Assigned Names & Numbers, a U.S. governmental organization under the Department of Commerce, or by the registrar's respective government to control domain name registration. A registrar is authorized by the registry to act as an agent of the registrar to process domain name registration. The registrar has the responsibility to create and maintain a Whois database and zone files for its customers. Examples of registrars presently include Register.com and Network Solutions, Inc., both authorized by ICANN.

A "registrant" is the individual or organization to whom a specific domain name is registered with the registry. Once a registrant has registered a domain name, paid the associated fees and met certain conditions, the individual or organization holds the domain name for use for a specific period of time. The registrant can use the domain name for such purposes as web hosting and e-mail. In many cases, the registrant may incorporate one or more domain names into an organizational identity or business. As such, a registration to use a particular domain name can be viewed as a significant asset for certain registrants.

The "shared registry system" (SRS) is a system that permits multiple registrars to provide registration services for the .com, .net and .org domains and such other top level domains as become available for commercial or public use. The system is a shared database that holds information about domain names and their authoritative name servers. The shared registry system updates the root zone file within the root servers with information about the domain names for the .com, .org and .net gTLDs about every twenty-four hours in typical operation. The SRS allows accredited registrars to enter information about newly registered domain names into the SRS, and the information about the newly registered domain names is then uploaded to the root servers. Accredited registrars can update name server information within the SRS for domain names for which they are recognized as registrar. Accredited registrars are registered with the SRS and access the SRS through a secure and authenticated communication channel, such as through a secure socket level encrypted communication link. The SRS facilitates the updating of domain name and IP address information and also provides a utility for identifying the registrar that registered a domain name, when the entry to the SRS was created and the authoritative name servers for the domain name.

SUMMARY OF THE PREFERRED EMBODIMENTS

An aspect of the present invention provides a method of identifying at least one domain name and determining at least one domain name server corresponding to the at least one domain name. The method includes downloading a root zone file, the root zone file comprising an authoritative list of domain names and associating each domain name with a registrar and at least one domain name server. A search characteristic is established and a string search performed in the downloaded root zone file. The method includes determining from the downloaded root zone file one or more domain names matching the search characteristic and, for each matching domain name, determining a corresponding registrar and at least one domain name server. Each matching domain name is stored in a data file, so that the data file associates each extracted domain name with the corresponding registrar and the at least one domain name server.

Another aspect of the invention provides a method of identifying all domain names associated with an entity and identifying zone information for each identified domain name. The method comprises downloading a root zone file, the downloaded root zone file comprising an authoritative list of domain names, the downloaded root zone file associating each domain name with a registrar and at least one domain name server. A search characteristic is established corresponding to an entity and a search is performed in the downloaded root zone file for the search characteristic. The method continues by determining from the downloaded root zone file one or more domain names matching the search characteristic and, for each matched domain name, a corresponding registrar and at least one domain name server. Each matching domain name is stored in a data file, so that the data file associates each matching domain name with the corresponding registrar and the at least one domain name server. The method continues by repeating, at least once, the successive processes of establishing a second search characteristic, identifying from the downloaded root zone file at least one additional domain name matching the second search characteristic and storing each additional matching domain name in the data file with the corresponding registrar and domain name information.

DETAILED DESCRIPTION OF THE PREFERRED EMBODIMENTS

Many companies seek to define their corporate identity at least in part in conjunction with one or more Internet domain names. This is true whether or not the company's business is conducted largely over the Internet. Building a brand identity in conjunction with a domain name makes a domain name registration valuable. When a company is successful in building the recognition of a domain name, it is important to maintain the domain name and to use that domain name as an important identifier for the company on the Internet.

A company or other entity may use a number of different individuals within the company to register domain names. For example, different divisions of the company might register domain names for the company in association with marketing efforts specific to the products of that division. Domain name registration is often advantageously accomplished using agents for the domain name registration. Different divisions within the company might register domain names using different agents or the same division within a company might use multiple agents to register domain names. Because of this, it is possible for a company's various domain names to be registered on a number of different name servers and it may be very difficult to keep track of all of the domain names registered to the company. There may consequently be a need to be able to efficiently find all domain names registered to the company and to determine what name servers are used for those domain names.

A different problem arises for a company that owns a number of trademarks. For a company that owns a number of valuable trademarks, it may be desirable to monitor domain names and domain name registrations to determine if another company or entity has registered a domain name that is undesirably similar to one of the company's trademarks.

Conventionally, when Network Solutions, Inc., was the sole registrar for domain names, a company could have addressed either of these domain name-tracking problems by issuing a "whois" command to the registry or zone file of Network Solutions. Now that there are multiple registrars, this technique is ineffective because a whois command identifies only the names within a given registrar's registry. To effectively identify domain names using a whois command requires that the whois command be individually issued to all of the registrars and the data from all of the whois requests accumulated. This is inconvenient.

Preferred embodiments of the present invention address this problem by utilizing root zone file data. Root zone file data are the data stored in the root zone file, one copy of which is present on each of the present-day thirteen root servers. Most preferably, embodiments of the present invention download the root zone file, for example, from a root server or directly from the Registry that maintains the root zone file and utilize the downloaded root zone file data. The Registry, presently Network Solutions, updates the information in the root zone file on a daily basis. Consequently, preferred embodiments of the present invention download a new copy of the root zone file if the available set of downloaded data are more than one day old so that the domain name and other zone file data are appropriately current. In some instances this means that the data should be downloaded on a daily basis. If the embodiments are used less frequently than on a daily basis, then it is appropriate to download the data less often.

It should be appreciated that certain of this information could be obtained without downloading the root zone file. For example, at least some entities presently or in the future have direct access to the root zone file. Queries could be directed into the root zone file and the data analyzed in that manner. Preferred embodiments of the present invention download the root zone file so that queries and searches of the root zone data are made on the downloaded root zone file data. This downloading process is time consuming, since the root zone file presently represents in excess of several gigabytes of information. A number of advantages are associated with downloading the entire root zone file, however. Higher speed searching is available. More complicated searching strategies can be used. In addition, it is possible to store the entire root zone file in high-speed memory, such as in dynamic random access memory (DRAM) of an appropriately configured server. Socket-based queries can then be made to the entire root zone data set.

The root zone file is a text file consisting of alphanumeric characters or data representing such characters and includes an authoritative list of domain names, the registrars for those names, and the domain name server for those names. The downloading operation may preferably be performed from a web server environment using, for example, a Perl script. At the present time, the root zone file is authoritative for all domain names. In the future, it is possible that the configuration of the root zone file might be changed to accommodate greater numbers of addresses or an altered architecture for the Internet. Should such a change occur, the term "root zone-file" should be interpreted as being the file that represents the authoritative compilation of domain names and domain name servers at such time.

After downloading, the root zone file data may be stored on a data server such as those that are manufactured and sold by Network Appliances or EMC Corporation. In some embodiments of the invention, searches are performed directly by accessing the data on such a server. In other embodiments, the entirety of the current root zone file data is loaded into high-speed memory such as DRAM and searches are performed in that environment. Searches are made from a command line or Unix environment on a computer workstation to a data server, although the searches might readily be performed from a browser environment on a computer. Generally a search for all of the domain names for a company will require several passes using different search strings representative of the company's name, product names, domain names, etc. A string search is formulated to capture a significant portion of the target name, word or phrase. For example, a search for all of register.com's domains might include one search using the character string "register". A second search might include the text string "firststepsite" and variations on that string to search for registrations related to register.com's presently offered product of FirstStepSite$^{SM}$. A succession of searches is then made to search for all of the domain names and corresponding domain name servers for these names. Those of ordinary skill will appreciate that the search might be conducted manually or using differing levels of computer automation including, for example, a script that automatically searches for a succession of terms input by a user or provided by the company that wants its domain names identified and located.

Regardless of how the search is implemented, certain information is extracted, generally by copying, from the downloaded root zone file, including the matching domain name, the associated registrar and the associated domain name server. The extracted results of the search are stored in a data file, for example within Excel or another widely available spreadsheet or database application, and the results of a succession of individual string searches are successively stored in the data file, preferably until the data file includes a substantially complete set of data related to a company's domain names.

A search for domain names that might infringe upon a company or other entity's trademarks is performed in a similar way. In such an implementation, search strings would be formulated on the basis of different trademarks and might well include misspellings, sound-alikes and other well-known types of variations on the trademark.

In summary, then, an embodiment of the present invention might, for example, provide a method of identifying all domain names associated with an entity and identifying zone information for each identified domain name. The method comprises downloading root zone file data, including an authoritative list of domain names, associated registrar information and associated domain name server information. Typically the downloaded root zone file data is a text file including in strings a domain name, character data identifying the registrar for that domain name and the domain name server for that domain name. String searches preferably are performed on the root zone data file, for example, searching for a character string characteristic of an entity name or domain name. The method identifies in the downloaded root zone file one or more domain names matching the search characteristic and, for each matched domain name, a corresponding registrar and at least one domain name server. Each matching domain name is stored in a data file, so that the data file associates each matching domain name with the corresponding registrar and the at least one domain name server. The method continues by repeating, at least once, the successive processes of establishing a second search characteristic, identifying from the downloaded root zone file at least one additional domain name matching the second search characteristic and storing each additional matching domain name in the data file with the corresponding registrar and domain name information.

While aspects and certain advantages of the present invention have been described herein with reference to certain preferred embodiments of the present invention, it should be appreciated that the present invention is not limited to the particular embodiments thereof. Those of ordinary skill in the art will appreciate that modifications and variations on the basic teachings of the present invention might be made without varying from the fundamental teachings thereof. Consequently, the scope of the present invention is to be determined from the claims, which follow.

What is claimed:

1. A method of identifying at least one domain name and determining at least one domain name server corresponding to the at least one domain name, the method comprising:

downloading a root zone file, the downloaded root zone file comprising an authoritative list of domain names, the downloaded root zone file associating each domain name with a registrar and at least one domain name server;

establishing a search characteristic and performing a string search in the downloaded root zone file;

identifying in the downloaded root zone file one or more domain names matching the search characteristic and, for each matching domain name, a corresponding registrar and a corresponding domain name server; and storing each matching domain name in a data file, the data file associating each matching domain name with the corresponding registrar and the corresponding domain name server.

2. The method of claim 1, wherein the downloading is from a root server.

3. A method of identifying all domain names associated with an entity and identifying zone information for each identified domain name, the method comprising:

downloading a root zone file, the root zone file data comprising an authoritative list of domain names, the downloaded root zone file associating each domain name with a registrar and at least one domain name server;

establishing a search characteristic corresponding to a name characteristic of an entity and performing a search in the registry for the search characteristic;

identifying from the downloaded root zone file one or more domain names matching the search characteristic and, for each matching domain name, a corresponding registrar and at least one domain name server;

storing each extracted domain name in a data file, the data file associating each matching domain name with the corresponding registrar and the at least one domain name server; and repeating at least once the successive processes of establishing a second search characteristic, identifying from the downloaded root zone file at least one additional domain name on the basis of the second search characteristic and storing each matching additional domain name in the data file.

4. The method of claim 3, wherein the search characteristic is a character string comprising a significant part of one of the entity's domain names.

5. The method of claim 3, wherein the search characteristic is a character string consisting of a root portion of one of the entity's domain names.

6. The method of claim 3, further comprising storing the downloaded root zone file data as a text file listing in a string domain names with identifying indicia for a registrar associated with each domain name and a domain name server associated with each domain name.

7. The method of claim 3, wherein the downloading is from a root server.

* * * * *